United States Patent
Tang et al.

(10) Patent No.: US 10,533,255 B2
(45) Date of Patent: Jan. 14, 2020

(54) SLURRY FORMULATIONS FOR FORMATION OF REACTIVE ELEMENT-DOPED ALUMINIDE COATINGS AND METHODS OF FORMING THE SAME

(71) Applicants: Zhihong Tang, Carmel, IN (US); Kevin E Garing, Indianapolis, IN (US); James K Knapp, Pittsboro, IN (US); Albert Feuerstein, Carmel, IN (US); Thomas F Lewis, III, Zionsville, PA (US)

(72) Inventors: Zhihong Tang, Carmel, IN (US); Kevin E Garing, Indianapolis, IN (US); James K Knapp, Pittsboro, IN (US); Albert Feuerstein, Carmel, IN (US); Thomas F Lewis, III, Zionsville, PA (US)

(73) Assignee: PRAXAIR S.T. TECHNOLOGY, INC., Danbury, CT (US)

(*) Notice: Subject to any disclaimer, the term of this patent is extended or adjusted under 35 U.S.C. 154(b) by 182 days.

(21) Appl. No.: 15/243,044

(22) Filed: Aug. 22, 2016

(65) Prior Publication Data
US 2017/0058405 A1   Mar. 2, 2017

Related U.S. Application Data

(60) Provisional application No. 62/210,820, filed on Aug. 27, 2015.

(51) Int. Cl.
*C23C 22/73* (2006.01)
*C23C 22/82* (2006.01)
(Continued)

(52) U.S. Cl.
CPC ............ *C23C 22/73* (2013.01); *C09D 5/103* (2013.01); *C09D 101/284* (2013.01);
(Continued)

(58) Field of Classification Search
None
See application file for complete search history.

(56) References Cited

U.S. PATENT DOCUMENTS

| 4,835,011 A | 5/1989 | Olson et al. |
| 5,000,782 A | 3/1991 | Olson et al. |

(Continued)

FOREIGN PATENT DOCUMENTS

EP    1199377 A2    4/2002

OTHER PUBLICATIONS

Wang et al.; Oxidation Behavior of Hf-Modified Aluminide Coatings on Inconel-718 at 1050 degree C; University of Nebraska—Lincoln, DigitalCommons@University of Nebraska-Lincoln; NASA Publications-National Aeronautics and Space Administration; Journal of Coating Science and Technology, 2014, vol. 1, No. 1, pgs. 25-45; E-ISSN: 2369-3355/14 2014 Lifescience Global.

*Primary Examiner* — Jeffrey D Washville
(74) *Attorney, Agent, or Firm* — Nilay S. Dalal

(57) ABSTRACT

Novel slurry formulations and processes for forming improved protective coatings used in the hot section components of gas turbine engines are provided. The process includes a unique two-step deposition methodology whereby the required concentration of reactive element within an improved reactive element doped aluminide coating can be consistently produced in a reproducible manner.

17 Claims, 2 Drawing Sheets

Figure 1 shows a block flow diagram, in accordance with principles of the present invention, for a process of forming a RE modified aluminide coating.

(51) Int. Cl.
*F01D 25/00* (2006.01)
*C09D 101/28* (2006.01)
*F01D 5/28* (2006.01)
*F01D 9/02* (2006.01)
*C23C 30/00* (2006.01)
*C09D 5/10* (2006.01)
*C23C 10/58* (2006.01)
*C23C 28/00* (2006.01)

(52) U.S. Cl.
CPC .............. *C23C 10/58* (2013.01); *C23C 22/82* (2013.01); *C23C 28/321* (2013.01); *C23C 28/3455* (2013.01); *C23C 30/00* (2013.01); *F01D 5/288* (2013.01); *F01D 9/02* (2013.01); *F01D 25/007* (2013.01); *F05D 2220/32* (2013.01); *F05D 2230/23* (2013.01); *F05D 2230/30* (2013.01); *F05D 2230/40* (2013.01); *F05D 2230/90* (2013.01); *F05D 2300/1431* (2013.01); *F05D 2300/1434* (2013.01); *F05D 2300/1435* (2013.01); *F05D 2300/182* (2013.01); *F05D 2300/20* (2013.01)

(56) References Cited

U.S. PATENT DOCUMENTS

| | | |
|---|---|---|
| 5,366,765 A | 11/1994 | Milaniak et al. |
| 5,514,482 A | 5/1996 | Strangman |
| 6,673,709 B2 | 1/2004 | Jaslier et al. |
| 2009/0126833 A1* | 5/2009 | Cavanaugh ............. C23C 10/20 148/248 |
| 2012/0114970 A1 | 5/2012 | Walker |

* cited by examiner

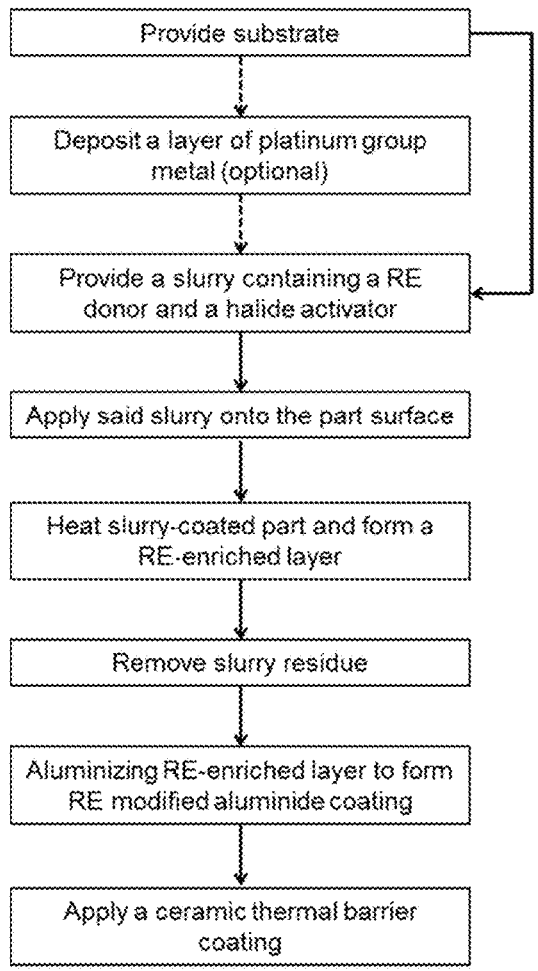
Figure 1 shows a block flow diagram, in accordance with principles of the present invention, for a process of forming a RE modified aluminide coating.

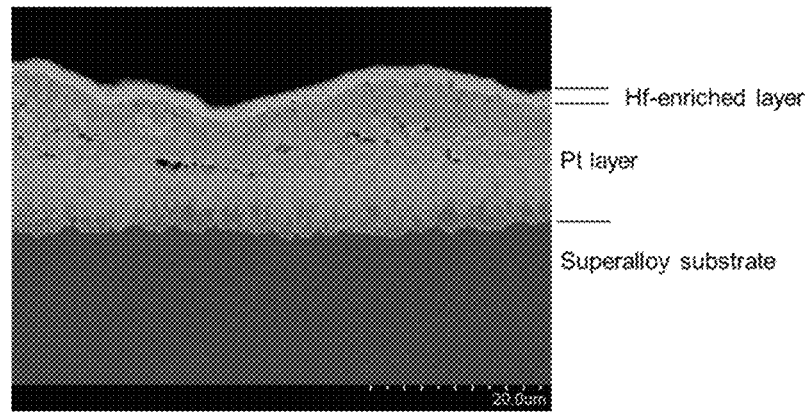

Figure 2 shows a SEM micrograph of the Hf-enriched layer that is a precursor for production of the Hf-modified platinum aluminide coating after performing Hf deposition from a novel and improved slurry formulation of the present invention

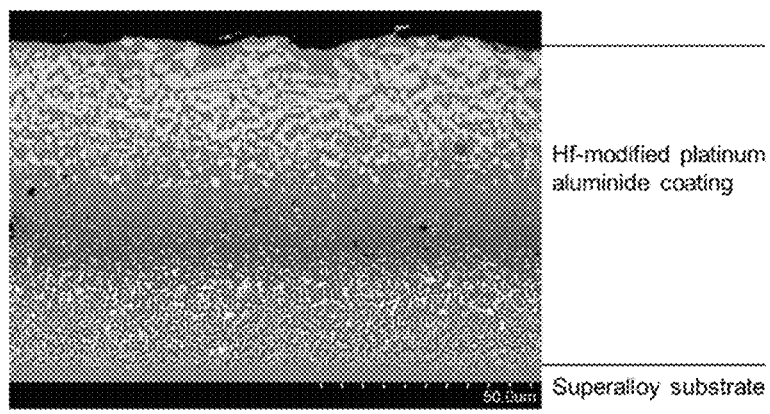

Figure 3 shows a SEM micrograph of the hafnium-modified platinum aluminide coating after vapor phase aluminizing in accordance with the principles of the present invention.

SLURRY FORMULATIONS FOR FORMATION OF REACTIVE ELEMENT-DOPED ALUMINIDE COATINGS AND METHODS OF FORMING THE SAME

RELATED APPLICATIONS

This application claims the benefit of priority to U.S. provisional application Ser. No. 62/210,820 filed on Aug. 27, 2015, the disclosure of which is incorporated by reference herein in its entirety.

FIELD OF THE INVENTION

This invention relates to novel slurry formulations and processes for forming improved protective coatings used in the hot section components of gas turbine engines. More particularly, this invention relates to a novel process and novel slurry formulation for forming an improved reactive element-doped aluminide coating for enhanced environmental protection.

BACKGROUND OF THE INVENTION

The components in the hot sections of gas turbine engines are exposed to increasingly harsh operating environments. Such components during their operation rely on protective coatings that can increase their durability and reliability.

Components in the gas turbine engines are typically made from superalloy materials. Although such superalloy materials impart suitable high-temperature mechanical properties, they possess insufficient environmental resistance. Consequently, superalloy components, such as combustors, high pressure blades, shrouds and vanes, have been applied with diffusion aluminide coatings for protection against oxidation and corrosion attacks at high temperatures. These aluminide coatings are used singularly or as bond coats for the thermal barrier coating (TBC) systems. Aluminide coatings are sufficiently rich in aluminum (Al) to form a protective and thermally grown oxide scale, known as alpha alumina. They are generally produced by enriching the superalloy surface with aluminum by various methods such as pack cementation, vapor phase process or chemical vapor deposition.

Further on-going improvements in gas turbine engine performance has required even higher operating efficiency and reduced emission, which necessitated the development for improved aluminide coatings capable of withstanding higher operating temperatures. One strategy recognized and accepted in the industry to improve the performance of aluminide coatings is to incorporate a small amount of so-called reactive element (RE), such as hafnium, zirconium, yttrium, lanthanum, or cerium, to produce a reactive element (RE)-doped aluminide coating that can enhance the high-temperature oxidation resistance of metallic alloys and coatings. Furnace cycle testing ("FCT") as used herein is used to quantify the oxidation resistance of an aluminide coating or a thermal barrier coating ("TBC") system with an aluminide bond coat. Typical reactive elements include, but are not limited to hafnium, zirconium, yttrium, and lanthanide series of elements in the periodic table. The minor additions of such reactive elements are known to significantly enhance the high-temperature oxidation resistance of the aluminide coatings during thermal cycling.

FCT oxidation resistance of the RE-doped aluminide coating has been recognized to be sensitive to concentrations of RE in the coating. In this regard, the so-called FCT performance can range from no improvement up to about 4× improvement over conventional diffusion aluminide coatings without any RE incorporated therein.

To date, various processes have been explored to form reactive element-doped aluminide coatings. The phrase "reactive element-doped aluminide coating" as used herein and throughout the specification refers to the diffusion aluminide coatings that include at least one of the reactive elements selected from the group of hafnium, zirconium, yttrium, lanthanum, and/or cerium, the presence of which can enhance the performance of the conventional diffusion aluminide coating under corrosive environments. Such processes include pack cementation, vapor phase processes, or chemical vapor deposition (CVD) processes, in which the additions of RE donor materials into the aluminizing coating retort are employed. However, these processes have numerous drawbacks whereby repeatability of RE concentration cannot be attained so as to produce consistent and acceptable FCT performance.

Thus, there exists a need for a simpler, more economical and controllable method to produce RE-doped aluminide coatings on surfaces, including part surfaces having complex geometries such as high-pressure turbine blades, vanes, and shrouds in the gas turbine engines. Other advantages and applications of the present invention will become apparent to one of ordinary skill in the art.

SUMMARY OF THE INVENTION

In a first aspect of the present invention, a reactive element (RE)-doped aluminide coating derived from a slurry formulation comprising: a RE donor powder comprising a RE component selected from the group consisting of hafnium (Hf), zirconium (Zr), yttrium (Y), lanthanum (La), cerium (Ce), and any combination thereof; a halide-containing activator powder selected from the group consisting of aluminum fluoride, ammonium fluoride, chromium fluoride, ammonium chloride, chromium chloride, hafnium chloride, hafnium fluoride, hafnium oxychloride, zirconium chloride, zirconium fluoride, zirconium oxychloride, lanthanum chloride, yttrium chloride and any combination thereof; an inert filler powder; and a binder solution, said binder solution comprising a binder material dissolved in a solvent.

In a second aspect of the present invention, a RE-enriched layer which is a precursor to a reactive element (RE)-doped aluminide coating, said RE-enriched layer deposited along a substrate and comprising: at least one RE selected from the group consisting of Hf, Zr, Y, La, and Ce in a concentration ranging from about 20-50 percent of the total weight of the RE-enriched layer; said RE-enriched layer chemically bonded to the surface of the substrate; said RE-enriched layer having a thickness of about 0.2 to about 10 micrometers.

In a third aspect of the present invention, a method for producing a RE-enriched layer onto a part, comprising the steps of: providing a RE donor slurry comprising a RE donor and a halide activator; applying said RE donor slurry onto the part; heating the RE donor slurry to generate a halide vapor; reacting the halide vapor with said RE component contained in the donor slurry to produce RE halide gases; transporting said RE halide gases with the part surface in the absence of a carrier gas; depositing said RE onto the part in the absence of a carrier gas; followed by diffusing said RE into the part; and then chemically bonding the RE-enriched layer onto the part; after RE deposition, removing the un-reacted slurry residues from RE-enriched layer In a fourth aspect, a reactive-element (RE)-doped aluminide coating prepared by a process, comprising the steps of: providing a RE donor slurry comprising a RE donor and a halide activator; applying said RE donor slurry onto the part; heating the halide activator to generate a halide vapor; reacting the halide vapor with said RE component contained in the donor slurry to produce RE halide gases; transporting said RE halide gases to the part surface in the absence of a carrier gas; depositing said RE onto the part surface; followed by diffusing said RE into the part surface; and then forming the RE-enriched layer onto the part surface; after RE deposition, removing the un-reacted slurry residues from RE-enriched layer; depositing an aluminum-based material onto the part so as not interfere with the deposition of said RE halide gases; diffusing an aluminum-based material into said RE-enriched layer; aluminizing said RE-enriched layer; and forming an RE-doped aluminide coating.

In a fifth aspect, a reactive-element (RE)-doped platinum aluminide coating adapted for use as an improved bond coat for ceramic thermal barrier coatings, said bond coat prepared by a process, comprising the steps of: depositing a platinum group metal selected from platinum, palladium, Iridium, and Rhodium and any combination thereof; providing a RE donor slurry comprising a RE donor and a halide activator; applying said RE donor slurry onto the part surface; heating the halide activator to generate a halide vapor; reacting the halide vapor with said RE component contained in the donor slurry to produce RE halide gases; transporting said RE halide gases with the part surface in the absence of a carrier gas; depositing said RE onto the part surface; followed by diffusing said RE into the part surface; and then forming the RE-enriched layer onto the part; removing the slurry residues from the RE-enriched layer; depositing an aluminum-based material onto the part surface so as not interfere with the deposition of said RE halide gases; diffusing an aluminum-based material into said RE-enriched layer; aluminizing said RE-enriched coating layer; forming an RE-doped platinum aluminide coating; and applying a ceramic thermal barrier coating over said RE-doped platinum aluminide coating.

The invention may include any of the aspects in various combinations and embodiments to be disclosed herein.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein:

FIG. 1 shows a block flow diagram for creating the RE-doped aluminide coating in accordance with the principles of the present invention;

FIG. 2 shows a SEM micrograph of the RE-enriched layer that is a precursor for production of the RE-doped aluminide coating after performing RE deposition from a novel and improved slurry formulation of the present invention; and FIG. 3 shows a SEM micrograph of the RE-doped aluminide coating after aluminizing in accordance with the principles of the present invention.

DETAILED DESCRIPTION OF THE INVENTION

The objectives and advantages of the invention will be better understood from the following detailed description of the embodiments thereof in connection. The present disclosure relates to novel slurry formulations for producing improved aluminide coating and novel methods for forming such improved aluminide coating. The disclosure is set out herein in various embodiments and with reference to various aspects and features of the invention.

The relationship and functioning of the various elements of this invention are better understood by the following detailed description. The detailed description contemplates the features, aspects and embodiments in various permutations and combinations, as being within the scope of the disclosure. The disclosure may further be specified as comprising, consisting or consisting essentially of, any of such combinations and permutations of these specific features, aspects, and embodiments, or a selected one or ones thereof.

As used herein and throughout the specification, the term "RE-enriched layer" is intended to mean a specific RE coating that is intermediate to or a precursor to formation of the RE-doped aluminide coating. "Part" and "substrate" as used herein and throughout the specification will be used interchangeably and refer to any component such as any region or surface of a turbine blade component. All percentages are expressed herein as weight percentages unless indicated otherwise.

Although it has been recognized that the high-temperature oxidation performance of the aluminide coating is sensitive to the concentration and distribution of RE within the aluminide coating, the present invention recognizes that the ability to create such RE compositional control and repeatability from coating-to-coating with conventional processes is lacking. Further, these design challenges can be exacerbated with complex geometries such as high-pressure turbine blades, vanes, and shrouds in the gas turbine engines.

Moreover, the concentration of RE needs to be maintained within a relatively narrow range. In particular, if the RE concentration within the aluminide coating is below a predetermined lower limit, (i.e. below about 0.5 wt. %), there is no significant improvement detected in the coating performance. If the concentration of RE is above a predetermined upper limit, (i.e. above about 10 wt. %), the addition of RE can become ineffective due to the formation of a non-protective and fast-growing deleterious RE oxides during high temperature exposure. Conventional processes, including those mentioned above, cannot, reliably and consistently produce RE-doped aluminide coating on a repeatable basis in which the RE is contained within the aluminide coating in the prescribed concentration ranges.

From these shortcomings, the present invention has emerged. The present invention recognizes the need for the coating process to be able to control the concentration of RE from coating-to-coating so as to produce RE-doped aluminide coatings meeting applicable performance criteria on a consistent basis with higher repeatability compared to conventional processes. The present invention offers a novel solution for reliably and consistently coating various part surfaces, including those having complex geometries, with RE-doped aluminide coating that meet the applicable performance criteria.

In one embodiment, the present invention offers a unique process of forming RE-doped aluminide coatings on parts. The process is advantageous over conventional processes. Referring to the block diagram (FIG. 1), the present invention implements a novel 2-step deposition process to create formation of the resultant RE-doped aluminide coating onto a part. The present invention has discovered that the sequence of steps is critical to successful formation of the RE-doped aluminide coating. In a preferred embodiment, the RE is hafnium (Hf), as shown in FIG. 2. In particular, the RE is initially deposited in its entirety to form a RE-enriched layer on the part as detailed in FIG. 2. Specifically, the slurry containing RE donor powder and halide activator powder are provided and can be applied by any conventional means (e.g., brushing, dipping, spraying, injecting and the like) to the region of the substrate that is desired to be coated. The RE donor slurry is heated to generate a halide vapor. The halide vapor reacts with the RE component contained in the donor slurry to produce RE halide gases. Next, the RE halide gases are transported to the part surface. The transport can occur by diffusion. The relatively shorter diffusion path or distance required for the RE halide gases to migrate to the part surface helps to ensure RE deposition and further allows the ability to coat complex geometry parts. Further, such diffusive transport occurs in the absence of a carrier gas. RE is deposited onto the part; followed by diffusing the RE into the part. The RE-enriched layer which is formed is chemically bonded onto the part surface, thereby ensuring adherence during subsequent handling of the parts.

After processing, slurry residues can be removed by various methods, including wire brush, oxide grit burnishing, glass bead, high-pressure water jet or other conventional methods. Slurry residues typically comprise unreacted slurry compositional materials. The removal of any slurry residue is conducted in such a way as to prevent damage to the underlying RE-enriched layer.

After formation of the RE-enriched layer, the aluminum deposition can be performed. The aluminum deposition occurs in a manner so as to not interfere with the RE that has been previously deposited onto the part surface, in its desired amount. Conventional aluminizing processes can be employed to deposit aluminum as part of the second deposition of the present invention. Such conventional aluminizing processes include, by way of example, pack aluminizing, vapor phase aluminizing or slurry aluminizing. In a preferred embodiment, the aluminizing process is performed using vapor phase aluminizing as shown in FIG. 3 and indicated in the block diagram at FIG. 1. Utilizing vapor phase aluminizing preferably allows the same coating retort to be used for deposition of RE and subsequent deposition of Al. During the vapor phase aluminizing process, Al is deposited as aluminide on the part surface. Meanwhile, the RE in the RE-enriched layer along with elements from the substrate can diffuse outwards to form a RE-doped aluminide coating. The distribution and location of the RE within the RE-doped aluminide coating depends, at least in part, on the mechanism for the formation of the aluminide coating.

The resultant RE-doped aluminide coating can be used singularly as an oxidation-resistant coating in the hot sections of gas turbine engine. The resultant RE-doped aluminide coating can also serve as a bond coat for a thermal barrier coating system. For example, a ceramic thermal barrier coating (TBC) may be applied over the RE-doped aluminide coating as shown in the block diagram at FIG. 1. The TBC can be applied by any know processes, such as, by example, electron beam physical vapor deposition.

Applicants have discovered that many of the shortcomings of processes prior to the present invention are at least partially the result of the simultaneous or intermittent deposition or co-deposition of Al and RE occurring in a single step. For example, the simultaneous/intermittent deposition or co-deposition has a tendency to create poor RE compositional control and process reproducibility, as a result of Al and RE having significant differences in thermodynamic stabilities of their respective volatile halide gases. In particular, the Al and RE halide gases tend to transport at varying rates to the substrate surface so as to potentially create inconsistent RE levels from coating-to-coating, thereby failing to reproducibly create the necessary RE levels. On the contrary, the present invention has the ability to control the necessary RE concentration in aluminide coating in a reproducible manner by segregating RE deposition from Al deposition.

As part of the first deposition step in which RE is deposited, applicants have developed a new and improved slurry formulation for use in the unique process for producing the RE-enriched layer. The deposited RE serves as a so-called supply reservoir for RE to be subsequently diffused into the resultant coat upon Al deposition in accordance with the principles of the present invention. The slurry composition comprises a RE source, a halide activator, a filler material and a binder solution. The slurry composition comprises the RE source in a range from about 1% to about 50% of the slurry weight; a halide activator is in a range from about 0.1 to about 10% of the slurry weight; an inert filler material is in a range from 10 to 80% of the slurry weight; and a binder solution is in a range from 15% to about 50% of the slurry weight in which the binder solution includes a binder and a solvent. In a more preferred embodiment, the RE source is in a range from about 10% to about 30% of the slurry weight; a halide activator is in a range from about 1 to about 5% of the slurry weight; an inert filler material is in a range from 30 to 70% of the slurry weight; and a binder solution in a range from 20% to about 35% of the slurry weight in which the binder solution includes a binder and a solvent.

Various RE sources may be utilized, including elemental RE powder, or alloying powder containing RE, or any suitable compound containing RE or a mixture thereof. The RE source may be alloyed with other metals such Cr—Hf, Cr—Al—Hf, and MCrAlY alloy powder. The RE source may also be selected from a RE-containing compound such as HfC and $HfO_2$.

The improved attributes of the slurry formulation is based, at least in part, upon the selected combination of specific activators which are halide-based. The role of the halide activator in the slurry is to generate coating gases characterized as RE halide gases. Upon heating to the elevated temperature, the halide activator vaporizes and reacts with the RE source in the slurry to generate RE halide gases, which reacts with the substrate upon reaching the substrate surface to form a RE-enriched layer. The methodology employed by the present invention is in contradistinction to conventional slurry formulations for RE-doped aluminide coating which do not explicitly suggest, let alone recognize the use of halide activators in the slurry. By way of example, U.S. Pat. No. 6,673,709 to Jaslier et al. and US Patent Pub. No. 2012/0114970 to Walker are representative of conventional slurry formulations that are distinguishable from the present invention. In particular, the methodology utilized in such conventional slurry-based processes utilizes a slurry formulation that does not contain any type of activator, thereby create an inferior RE-enriched layer. The layer is not chemically bonded as the inventive RE-enriched layer is, but, on the contrary, utilizes mechanical anchoring for adherence. Applicants have discovered that such inferior slurry-based coatings, which are locally attached to the part surface, can easily dislodge or spall off from the part surface during handling.

The slurry composition of the present invention further comprises a binder solution, which contains a binder material dissolved in a solvent. The binder solution functions to hold the slurry constituents together without detrimentally interfering with the slurry constituents or the coated substrate. The binder must be capable of burning off cleanly and completely without interfering with the chromizing reactions. A preferred binder is hydroxypropylcellulose, which is commercially available under the trade name Klucel™, from Ashland Incorporation. Other binders may also be suitable for the present invention, including by way of example, a B-200 binder commercially made and sold by APV Engineered Coatings (Akron, Ohio).

The slurry composition comprises a filler material that can range from about 10% to about 80%. The filler material is chemically inert. The inert filler material does not participate in the chemical reactions in the slurry. Instead, the filler material is designed to impart a dilution effect to the slurry mixture. The inert filler material can also adjust the viscosity of the slurry mixture. In a preferred embodiment, alumina powder is utilized as the inert filler material. Other types of filler materials can be utilized, such as silica and kaolin.

The process of the present invention controls the slurry formulation and diffusion treatment conditions, thereby allowing reproducibility of the RE-doped aluminide coating. Generally speaking, suitable conditions for diffusion are 1200-1800° F. for a duration up to 12 hours. On the contrary, in the conventional processes which employ simultaneous deposition of reactive elements and aluminum, the deposition of reactive element is negatively affected by the deposition of aluminum, thus leading to poor RE compositional control and process reproducibility. Additionally, in accordance with the present invention, the partial pressure of the RE halide gases generated from the slurry only depends on the slurry formulation and processing temperature, irrespective of the slurry thickness after reaching a minimum thickness of about 250 micrometers. Such control is not possible with the conventional slurry processes, including those of Jaslier and Walker, where the resultant RE concentration is sensitive to the slurry thickness, thereby leading to poor compositional control and process reproducibility.

Still further, the process of the present invention requires no carrier gas for transport of the RE halide gases from coating source materials to the substrate surface, thereby avoiding process variations as described in the vapor phase or chemical vapor deposition process of the prior art. The use of thin slurry to form RE-enriched layer in present invention has the added benefit of more efficient utilization of expensive RE source materials. As such, the present invention can conserve overall slurry material and reduce waste disposal, thereby creating higher utilization of the slurry constituents and minimizing exposure of hazardous materials in the workplace.

It should be understood that either prior to applying the RE-containing slurry or after depositing the RE-enriched layer, the deposition of a platinum group metal selected from platinum, palladium, Iridium, and Rhodium can be performed by a suitable electroplating process as known in the art to form a RE-doped platinum aluminide coating.

One advantage of present invention over conventional aluminizing processes is that the RE concentration in the aluminide coating can be produced on a consistent basis in the first slurry process by controlling the slurry formulation and diffusion treatment conditions. On the contrary, in the so-called single-step conventional aluminizing processes, the deposition of the reactive element is negatively affected by the deposition of aluminum, thus leading to poor RE compositional control and process reproducibility.

The methods of the present invention represent a substantial improvement over reactive element-doped aluminide coatings produced from conventional pack, vapor or slurry processes, each of which contains numerous drawbacks. For example, the major drawback of pack process is the sensitivity of RE content in the coating to the ingredients of powder mixtures. A small variation in the amount of RE powder in the pack mixtures results in a large variation of RE content in the coating, thereby leading to poor coating compositional control and process reproducibility. Other drawbacks include poor utilization of relatively expensive RE sources into the resultant coating; generation of substantial waste materials; and potential plugging of cooling cavities and passages with coating powders. The present invention by virtue of the ability to produce the requisite RE concentration in a controlled and reproducible manner avoids these drawbacks of the pack process.

Although vapor phase process of prior art that employs simultaneous deposition of reactive elements and aluminum, avoids many of the significant disadvantages of the pack process, such as the generation of substantial waste materials and potential clogging of small cavities with powder, significant drawbacks to the vapor phase process remain, including failure to produce the requisite RE concentration in a controlled and reproducible manner.

With regards to CVD processes, the complex and customized tooling and on-going maintenance as typical and known to be utilized for many CVD processes, are not required by the present invention, thereby simplifying the overall process. Further, unlike CVD, no carrier gas is required to transport the RE halide gases to the part surface because the part surface to be coated is in direct contact with slurry, thereby avoiding the process variation from the coating gas transport.

The present invention also avoids the problems of the overlay coating process in which the RE-doped aluminide coating is deposited onto a metallic substrate by physical vapor deposition, thermal spray, or electroplating techniques. The overlay coating process is a line-of-sight process which presents significant difficulties in coating parts having complex geometries such as the under-platform region, cooling cavities, and tip holes of turbine blade. Further, the apparatus for physical vapor deposition and thermal spray is relatively expensive, unlike the apparatus for the present invention.

Still further, the novel slurry process of the present invention is superior in its ability to control the concentration of RE in a reproducible manner as compared to the conventional slurry processes. Further, the RE-enriched layer of the present invention is characterized by a chemical bond to the part surface in comparison to the weak mechanical adherence of a RE-containing layer created by conventional slurry processes.

The reactive element (RE)-doped aluminide coating process in accordance with present invention offers significantly improved performance in terms of oxidation resistance, as can be measured by its FCT life. For reasons not fully understood, the ability to control RE concentration within the step of forming the RE-enriched layer is producing a final RE-doped aluminide coating with superior FCT performance over conventional aluminide coatings with or without RE. Without being bound by any particular theory, the ability to control RE concentration in the RE-enriched layer which is a precursor to the RE-doped aluminide coating may be contributing to improved FCT performance over conventional aluminide coatings. The RE-enriched layer has a prescribed thickness; RE wt % content; and is chemically bonded to the surface such that the combination of these attributes may be synergistically interacting unexpectedly to create a novel structure with properties having improved oxidation resistance over conventional aluminide coatings with or without RE.

Additionally, it should be understood that the RE-enriched layer and the RE-doped aluminide coating may have other applications besides the use as an oxidation-resistant coating or a bond coat for thermal barrier coating system in the hot-sections of gas turbine engines. For example, the RE-doped aluminide coating may be utilized as oxidation and corrosion resistant coating for high-temperature applications in the following industries, including chemical processing, refining and petrochemical, fossil-fired power generation, coal gasification and others.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A reactive element (RE) enriched layer derived from a slurry formulation, said slurry formulation comprising:
    a RE donor powder comprising a RE component selected from the group consisting of hafnium (Hf), zirconium (Zr), yttrium (Y), lanthanum (La), cerium (Ce), and any combination thereof;
    a halide-containing activator powder selected from the group consisting of aluminum fluoride, ammonium fluoride, chromium fluoride, ammonium chloride, chromium chloride, hafnium chloride, hafnium fluoride, hafnium oxychloride, zirconium chloride, zirconium fluoride, zirconium oxychloride, lanthanum chloride, yttrium chloride and any combination thereof;
    an inert filler powder; and
    a binder solution, said binder solution comprising a binder material dissolved in a solvent;
    wherein said slurry formulation is characterized by an absence of a carrier gas.

2. The slurry formulation of claim 1, wherein said donor powder is in the range from about 1% to about 50% of the slurry weight, said halide-containing activator powder is in a range from about 0.1 to about 10% of the slurry weight, said the binder solution is in a range from 15% to about 50% of the slurry weight; and inert filler material is in a range from 10 to 80% of the slurry weight, wherein the aggregate of said donor powder, said halide-containing activator powder, said inert filler powder, and said binder solution is equal to 100% of the slurry weight.

3. The slurry formulation of claim 1, wherein said donor powder is in the range from about 10% to about 30% of the slurry weight, said halide-containing activator powder is in a range from about 1 to about 5% of the slurry weight, said binder solution is in a range from 20% to about 35% of the slurry weight and inert filler material is in a range from 30 to 70% of the slurry weight, wherein the aggregate of said donor powder, said halide-containing activator powder, said inert filler powder, and said binder solution is equal to 100% of the slurry weight.

4. A method for producing a reactive element (RE)-enriched layer onto a part, comprising the steps of:
    providing a RE donor slurry comprising a RE donor and a halide activator;
    applying said RE donor slurry onto the part;
    heating the RE donor slurry to generate a halide vapor;
    reacting the halide vapor with said RE component contained in the donor slurry to produce RE halide gases;
    transporting said RE halide gases onto the part surface in the absence of a carrier gas;
    depositing said RE onto the part; followed by
    diffusing said RE into the part; and then
    chemically bonding the RE-enriched layer onto the part; and
    removing the slurry residues from the RE-enriched layer.

5. The method of claim 4, further comprising the additional steps of:
    depositing an aluminum-based material onto the part so as not interfere with the preceding deposition of said RE halide gases;
    diffusing an aluminum-based material into said RE-enriched layer;
    aluminizing said RE-enriched layer; thereby
    forming an RE-doped aluminide coating.

6. The method of claim 4, further comprising the step of applying a ceramic thermal barrier coating over said RE-doped aluminide coating.

7. The method of claim 4, wherein said RE component comprises Hf.

8. The method of claim 4, wherein said RE-enriched layer has a thickness of about 0.2 micrometers to about 10 micrometers.

9. The method of claim 4, wherein said RE-enriched layer has a thickness ranging from about 0.5 to 5 micrometers.

10. The method of claim 5, wherein said aluminizing is a vapor phase aluminizing process.

11. The method of claim 4, further comprising forming the RE-enriched layer onto a part, said part being a region of a turbine blade, said region being an under-platform, cooling cavity, and/or tip holes of the turbine blade.

12. The method of claim 4, further comprising the step of performing an electroplating process to deposit a platinum group metal selected from platinum, palladium, Iridium, and Rhodium and any combination thereof, said deposition of the platinum group metal performed either prior to applying the RE donor slurry onto the part or after depositing the RE-enriched layer.

13. A reactive-element (RE)-doped aluminide coating prepared by a process, comprising the steps of:
    providing a RE donor slurry comprising a RE donor and a halide activator;
    applying said RE donor slurry onto the part surface;
    heating the halide activator to generate a halide vapor;
    reacting the halide vapor with said RE component contained in the donor slurry to produce RE halide gases;
    transporting said RE halide gases with the part surface in the absence of a carrier gas;
    depositing said RE onto the part surface; followed by
    diffusing said RE into the part surface; and then
    forming the RE-enriched layer onto the part;
    removing the slurry residues from the RE-enriched layer;
    depositing an aluminum-based material onto the part surface so as not interfere with the deposition of said RE halide gases;
    diffusing an aluminum-based material into said RE-enriched layer;
    aluminizing said RE-enriched coating layer; and
    forming an RE-doped aluminide coating.

14. The reactive-element (RE)-doped aluminide coating of claim 13, prepared by the process, further comprising forming the RE-enriched layer further comprises a thickness that is substantially uniform across the part surface as detected by optical microscopy or scanning electron microscopy.

15. The reactive-element (RE)-doped aluminide coating of claim 13, prepared by the process further comprising performing an electroplating to deposit a platinum group metal selected from platinum, palladium, Iridium, and Rhodium and any combination thereof, said deposition of the platinum group metal performed either prior to applying the RE donor slurry onto the part or after depositing the RE-enriched layer.

16. The reactive-element (RE)-doped aluminide coating of claim 13, prepared by the process, further comprising applying a ceramic thermal barrier coating over said RE-doped aluminide coating.

17. A reactive-element (RE)-doped platinum aluminide coating adapted for use as an improved bond coat for ceramic thermal barrier coatings, said bond coat prepared by a process, comprising the steps of:

depositing a platinum group metal selected from the group consisting of platinum, palladium, Iridium, Rhodium and any combination thereof;
  providing a RE donor slurry comprising a RE donor and a halide activator;
  applying said RE donor slurry onto the part surface;
  heating the halide activator to generate a halide vapor;
  reacting the halide vapor with said RE component contained in the donor slurry to produce RE halide gases;
  transporting said RE halide gases with the part surface in the absence of a carrier gas;
  depositing said RE onto the part surface; followed by
  diffusing said RE into the part surface; and then
  forming the RE-enriched layer onto the part;
  removing the slurry residues from the RE-enriched layer;
  depositing an aluminum-based material onto the part surface so as to not interfere with the deposition of said RE halide gases;
  diffusing an aluminum-based material into said RE-enriched layer;
  aluminizing said RE-enriched coating layer;
  forming an RE-doped platinum aluminide coating; and
  applying a ceramic thermal barrier coating over said RE-doped platinum aluminide coating.

* * * * *